United States Patent [19]
Fourty

[11] Patent Number: 5,827,917
[45] Date of Patent: Oct. 27, 1998

[54] METHOD FOR TREATING A TALC POWDER WITH A VIEW TO INCORPORATING IT IN A THERMOPLASTIC MATERIAL

[75] Inventor: Georges Fourty, Toulouse, France

[73] Assignee: Talc de Luzenac, Luzenac, France

[21] Appl. No.: 663,057

[22] Filed: Jun. 18, 1996

[30] Foreign Application Priority Data

Dec. 28, 1993 [FR] France .................................. 93 15855

[51] Int. Cl.⁶ ............................. C08J 5/10; C08K 3/34; C08L 29/02
[52] U.S. Cl. ........................... 524/451; 264/148; 264/109
[58] Field of Search ........................... 524/451; 264/115, 264/117, 118, 119, 148, 109

[56] References Cited

U.S. PATENT DOCUMENTS

| | | | |
|---|---|---|---|
| 4,241,001 | 12/1980 | Lamond et al. ......................... | 264/117 |
| 4,814,019 | 3/1989 | Weber ..................................... | 106/469 |
| 5,176,751 | 1/1993 | Findley ................................... | 106/502 |

FOREIGN PATENT DOCUMENTS

| | | |
|---|---|---|
| 0 382 229 | 8/1990 | European Pat. Off. . |
| 4-81440 | 3/1992 | Japan . |
| 4 306 261 | 10/1992 | Japan . |
| 1 178 846 | 1/1970 | United Kingdom . |

*Primary Examiner*—James J. Seidleck
*Assistant Examiner*—U. K. Rajguru
*Attorney, Agent, or Firm*—Young & Thompson

[57] ABSTRACT

Method of incorporation a talcum powder into a material, in particular a thermoplastic material. The method consists in (a) mixing the talcum powder with water and a polyethylene glycol, a polypropylene glycol or a copolymer of these compounds, (b) pressing the mixture through dies and sectioning it to obtain granules of an average size exceeding that of the grains of the initial powder, (c) incorporating in the material the product obtained, (d) subjecting the dispersion to mechanical action to break up the granules and to release and distribute in the mass the grains of the initial powder. The invention is characterized by incorporating small particle-sized talcum powders into materials, especially thermoplastic materials, without the practical problem involved in incorporating small particle-sized powders.

16 Claims, 3 Drawing Sheets

5,827,917

METHOD FOR TREATING A TALC POWDER WITH A VIEW TO INCORPORATING IT IN A THERMOPLASTIC MATERIAL

FIELD OF THE INVENTION

The invention concerns a method enabling talc powder to be incorporated in a material, in particular a thermoplastic material. It is applicable in a particularly favorable manner to the incorporation of fine talc powders with a mean particle size of less than 5 microns into thermoplastic materials such as polypropylene. The invention extends to a method for treating the powder which makes this incorporation possible and to the product obtained as a result of said treatment.

BACKGROUND OF THE INVENTION

It is known that, in many applications, talc is incorporated in the form of powder in a base material, in particular a plastic or thermoplastic material to improve the mechanical properties, in particular rigidity and deformation temperature. However, this incorporation generally leads to a reduction in the impact and scratch resistance of the material obtained. It is known that the use of a very fine particle size reduces these two defects and in particular it is accepted that the use of powders with a mean particle size of less than 5 microns, and particularly of the order of 2 microns, enables components to be obtained with satisfactory properties.

(In the following the expression "fine powder" will denote a powder with a mean particle size of less than or equal to 5 microns).

The incorporation of fine talc powders in a material presents, in practice, many problems. In point of fact, fine talc powders very easily escape into the air and existing mixing installations are very unsuited to operating with powders which very easily escape into the air. As an example, the apparent density of a talc powder with a mean particle size of around 2 microns is of the order of 0.3. Problems appear particularly with metering devices which no longer make it possible to meter regular and precise amounts and difficulties also appear when transferring fine powders from feed hoppers to screw mixers, since the very low apparent density of the powder confers on the latter a state intermediate between the solid state and the fluid state (a state similar to that of a fluidized powder) which prevents these transfers and mixing operations from being carried out satisfactorily by conventional mechanical means. In certain cases it is quite impossible to transfer powder from the feed hopper of the installation. In other cases, very large spillages are encountered, as well as the incorporation of large quantities of air which lead to cavities in the material obtained. Back-flow phenomena are also noted through the feed hoppers which bring about the production of large quantities of dust. In addition, these various difficulties limit the percentage of fine talc powder which it is possible to add to the base material. It is no longer strictly possible, in known installations, to prepare mixtures with more than 25% of fine powder.

To attempt to remedy these disadvantages, certain machine manufacturers have added supercharging screws to installations in order to increase the density of the mass of powder which is introduced into the machine. These supercharging screws bring about an improvement for powders of intermediate mean particle size (from 15 to 5 microns) but operate very badly in the case where very fine powder is used since the supercharging screw does not enable a sufficient increase in density to be arrived at. In addition, these supercharging screws do not eliminate all the defects previously referred to, in particular irregularities in metering (metering being carried out upstream from the supercharged feed).

Elsewhere, U.S. Pat. No. 4,241,001 describes a method for manufacturing dense granules from powder, which consists of adding a wetting agent to the powder, in particular water, and of dividing the paste obtained mechanically into granules. This patent recommends the addition of certain agents which increase the cohesion of each granule (oily emulsion, a binder of the molasses type, oleaginous liquid etc.) This technique is however incapable of resolving the problem of the invention consisting of permitting fine talc powders to be incorporated in materials, while preserving the improved properties derived from the small size of the powder grains. In point of fact, the cohesion and stability of the granules obtained in this technique make these equivalent to a powder with a higher particle size (equal to that of the granules). The practical difficulties of incorporation are overcome but improvements in the properties of the material, due to the small particle size of the talc, are totally lost.

SUMMARY OF THE INVENTION

The present invention provides a new technique for incorporating a talc powder in a material with a view to overcoming totally the above-mentioned defects. Its aim is to make it possible to profit fully from the advantages of incorporating talc powders with a small particle size (improvements to the properties of the material such as rigidity and deformation temperature, without affecting in particular the impact and scratch resistance of the latter) and this without leading to practical difficulties of incorporating the powders in the material.

An objective of the invention is in particular to make it possible to incorporate fine talc powder whilst using existing machines.

Another objective is to obtain the same performances with these machines as those obtained when denser powders are incorporated having much larger particle sizes.

For this purpose, the distinguishing features of the method according to the invention for incorporating a talc powder in a material are as follows:

a) the talc powder is mixed with water and a polyethylene glycol (PEG), polypropylene glycol (PPG) or a copolymer of these compounds, in relative proportions by weight of between 10% and 35% of water with respect to the weight of dry talc and between 0.05% and 2% of PEG, PPG or copolymer with respect to the weight of dry talc, b) the mixture is pressed through dies and chopped into lengths on leaving the dies so as to obtain granules with a mean size greater than that of the grains of the initial powder, c) the products obtained are incorporated in the material, either in the form of granules resulting from the chopping operation, or, following handling operations, in the form of a mixture of powder and agglomerates resulting from partial disintegration of these granules, d) mechanical dispersion is carried out so as to disintegrate the granules or agglomerates completely in order to release the grains of the initial powder and to distribute these in the mass of material.

Thus in the method of the invention, it is no longer the talc powder which is mixed with the base material, but a product with increased density which is in the form of granules or a mixture of powder and agglomerates of the grains of powder. This higher density product may be transferred and mixed without difficulty using conventional installations. After mixing in the material, these granules or agglomerates are disintegrated to release the grains of the initial powder, which are dispersed in the material so as to end up with a result identical to that obtained by direct dispersion of the original powder, but without all the technical difficulties encountered with a powder of small particle size. The material may be incorporated by sing granules directly resulting from the chopping operation (where appropriate, after a drying operation as will be seen subsequently). It is also possible to subject the granules to various operations of handling, conveyance, transfer and putting into silos etc. and then to incorporate the product into the material. A certain amount of disintegration of the granules then occurs and the product is in the form of powder and agglomerates, the density of which is slightly reduced compared with that of the granules. For example a fine talc powder with a mean particle size of 2 microns has a tamped apparent density of the order of 0.35 to 0.40 (ISO standard 787/11). The granules obtained from the chopping operation have a density which has increased to the value of the order of 0.90 to 1.60 according to the operating conditions and after handling, a slight reduction in density is noted (of the order of 10% to 20% according to the type of product and the handling operations). The product retains in any case a density of the order of double or three times that of the initial powder. The ability then to release the grains of powder and to redisperse them, when incorporated in the material, is due to the addition of PEG, PPG or a copolymer in the proportions referred to above during stage (a) of the method. If this compound is not added, it is found that part of the agglomerates remain in the material and form small non-homogeneous lumps so that it is no longer possible to profit fully from the improvements in properties due to the addition of fine talc powder. On the one hand, a reduction in the impact and scratch resistance of the material is observed (of the same order as that obtained with coarser powders) and the value of using a fine or very fine powder is then lost and on the other hand, the absence of homogeneity of the talc within the material is a factor which limits improvements to other mechanical properties of the material. In addition, at the outlet from most mixing installations, there is a sieve through which the base material is passed in the molten state after incorporation of talc, and undispersed talc agglomerates block this sieve until they interrupt the operation of the installation. Addition of PEG, PPG or copolymer in the proportions defined above, enables on the other hand total release of the grains of the initial powder to be achieved so as to obtain a perfect dispersion of these in the material, by a mechanism which is currently incompletely explained. By "the addition of PEG, PPG or copolymer", is meant the addition of one of these compounds as well as the addition of any mixture of said compounds. (It should be noted that PEG is referred to in U.S. Pat. No. 4,814,019 as a compound that can be used in admixture with certain condensates to increase the whiteness and/or the thermal stability of certain talcs of Chinese, Australian or Italian origin).

When the talc powder has to be incorporated in an organic material, for example in a plastic or thermoplastic material, the granules are preferably dried before being incorporated in the material in order to remove water until a residual moisture content is reached of less than 0.5% of water by weight with respect to the weight of dry talc.

Moreover, an excellent result is obtained by using PEG, PPG or a copolymer having a molecular weight of between 100 and 50,000. Preferably, the PEG, PPG or copolymer is dissolved in water, and the talc powder is then added to the solution in order to obtain the mixture. It should be noted that a PEG or PPG having a molecular weight of between 100 and 600 is in the form of a liquid and for molecular weights between 600 and 50,000 is in the form of a water-soluble solid. For high molecular weights (greater than 2000) the product is preferably used in a finely divided state so as to make it easier to dissolve in water.

The mixing conditions which provide the best performances are as follows:

the proportion by weight of water is between 15% and 30% with respect to the weight of dry talc, the proportion by weight of PEG, PPG or copolymer is between 0.1% and 0.5% with respect to the weight of dry talc.

Pressing and chopping the mixture into lengths on leaving the dies is preferably carried out in such a way that the mean size of the granules is between 3 mm and 20 mm.

The method is particularly suitable for incorporating a fine talc powder into a base material, that is to say a powder with a mean particle size of less than or equal to 5 microns.

The method of the invention is applicable in particular for incorporating a talc powder as a filler in a thermoplastic material. According to a first method of operation, after mixing, pressing, extrusion, chopping into lengths and preferably drying, the talc granules obtained are incorporated and mixed in the thermoplastic material in the divided solid state, the whole is heated until the thermoplastic material melts and mechanical dispersion is carried out by mixing the viscous material obtained.

According to another operating method, the thermoplastic material is first of all heated until it melts, and the talc granules are then incorporated in the molten thermoplastic material and mechanical dispersion is carried out by mixing the viscous material obtained.

The thermoplastic material may in particular be polypropylene (homopolymer, copolymer or a mixture of one of these products with an elastomer, the PP remaining in a major proportion), talc granules being incorporated in the said material in a proportion by weight which depends on the application, generally between 5% and 60% of talc with respect to polypropylene.

The invention extends, as a new product, to the intermediate product obtained which is intended to be incorporated as a filler in a material. This product, with a tamped apparent density of between 0.4 and 1.6, comprises granules or agglomerates of talc grains containing between 0.1% and 2% of PEG, PPG or a copolymer of the compounds, the grains of talc having a size less than or equal to 5 microns (the tamped apparent density is measured according to ISO standard 787/11).

BRIEF DESCRIPTION OF THE DRAWINGS

The invention is illustrated by the following examples which have been put into operation in installations such as shown diagrammatically by way of example in the drawings. In these drawings.

DETAILED DESCRIPTION OF THE INVENTION

Figure 1:
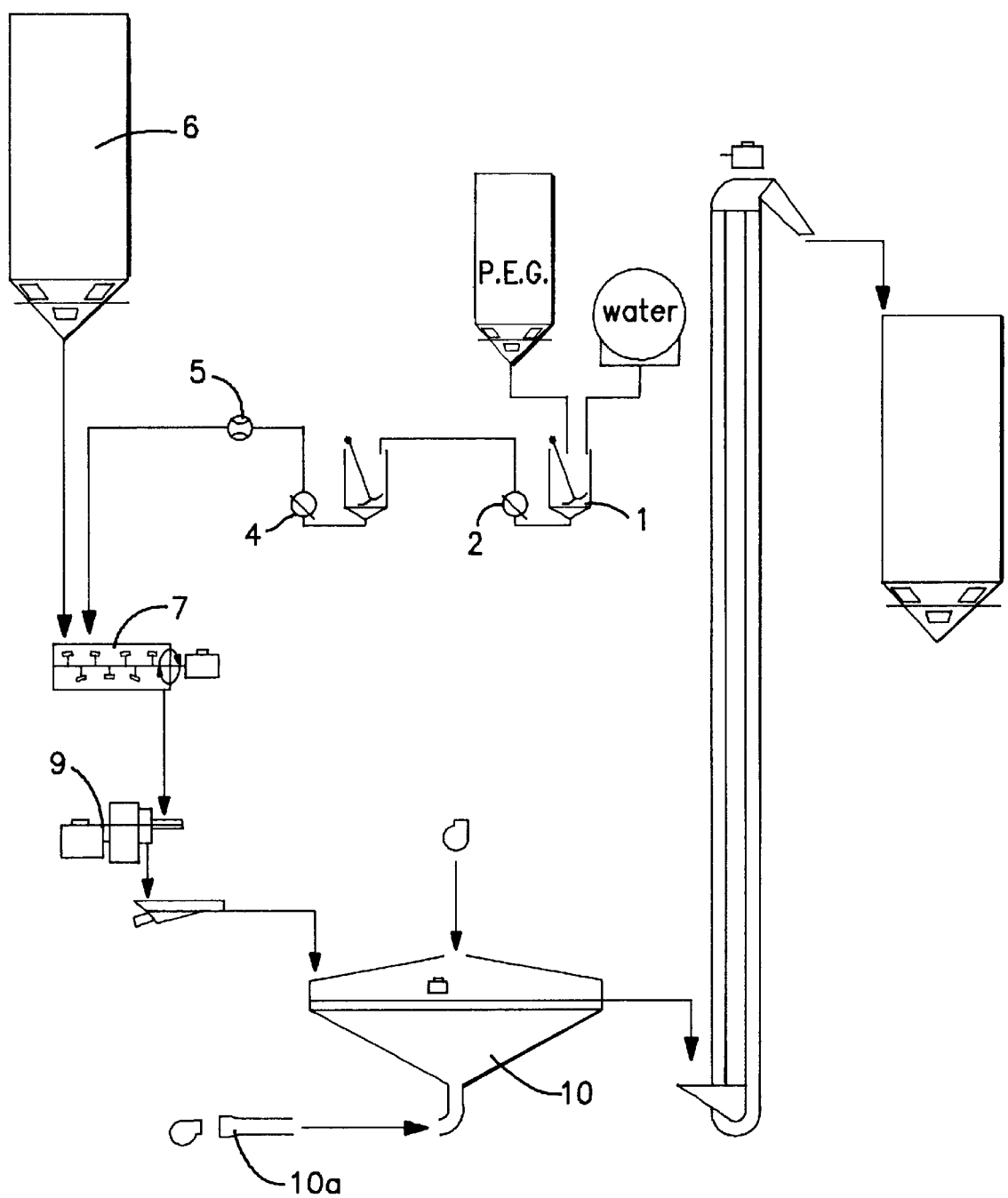
FIG. 1 is a diagram of a granulating installation enabling the intermediate product aimed at by the invention to be obtained.

The installation represented in FIG. 1 comprises assemblies which are conventional in themselves: vessel 1 for preparing a 1.66% aqueous PEG solution (concentration by weight), a pump 2 for transferring it to a buffer vessel 3 for distribution, a metering pump 4, a flow meter 5, a feed hopper 6 for fine talc powder, a mixer 7 for the aqueous PEG solution and talc, a granulating press 9, and a dryer 10 with its burner 10a, capable of bringing the moisture content to a value of less than 0.5%.

Figure 2:
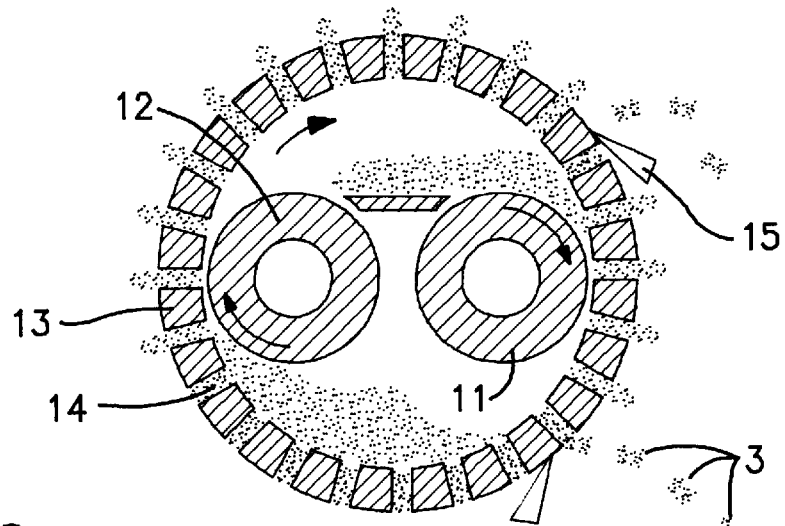
FIG. 2 is a diagrammatic cross section of the pressing assembly of this installation.

FIG. 2 shows the pressing and cutting assembly of the press 9. This assembly, in itself conventional, comprises two rollers 11 and 12, which turn inside a cylinder 13 carrying a plurality of dies such as 14; the cylinder 13 is rotated by a motor and drives the rollers by friction. Sets of knives such as 15 are provided at the outlet from the dies to cut the small strands obtained into lengths.

Figure 3:
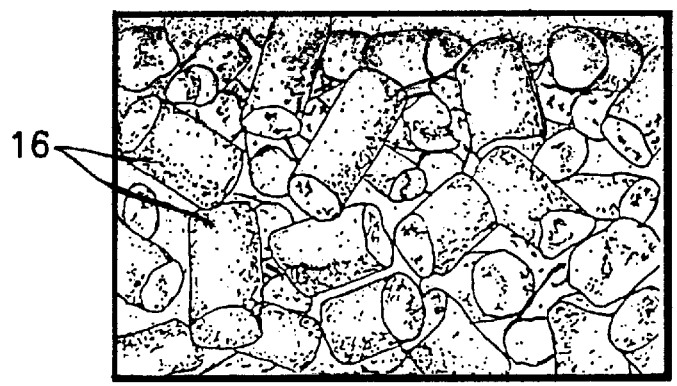
FIG. 3 is a diagrammatic representation, on an enlarged scale, of the product obtained after it is chopped into lengths.

The product obtained is shown diagrammatically in FIG. 3. It consists of granules formed of small cylindrical lengths of agglomerated talc powder.

Figure 4:
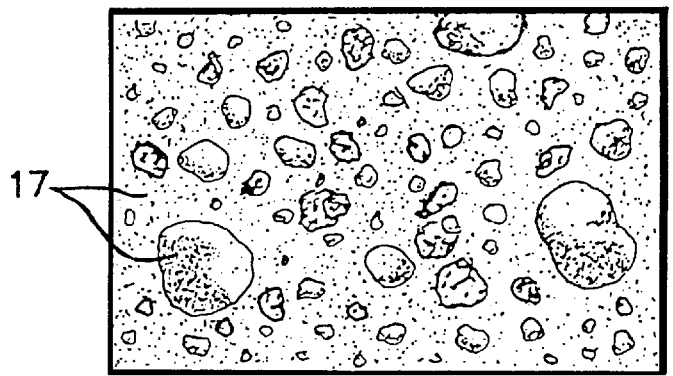
FIG. 4 is a diagrammatic representation, on an enlarged scale, of the product obtained after handling.

This same product has been shown diagrammatically in FIG. 4, after the various handling operations: putting into the silo, filling a tanker lorry, conveyance for 1000 km and putting into a silo again. The product is in the form of a powder mixed with grain agglomerates having sizes which vary from the initial grain size of the powder to agglomerates of the order of millimetres.

Figure 5:
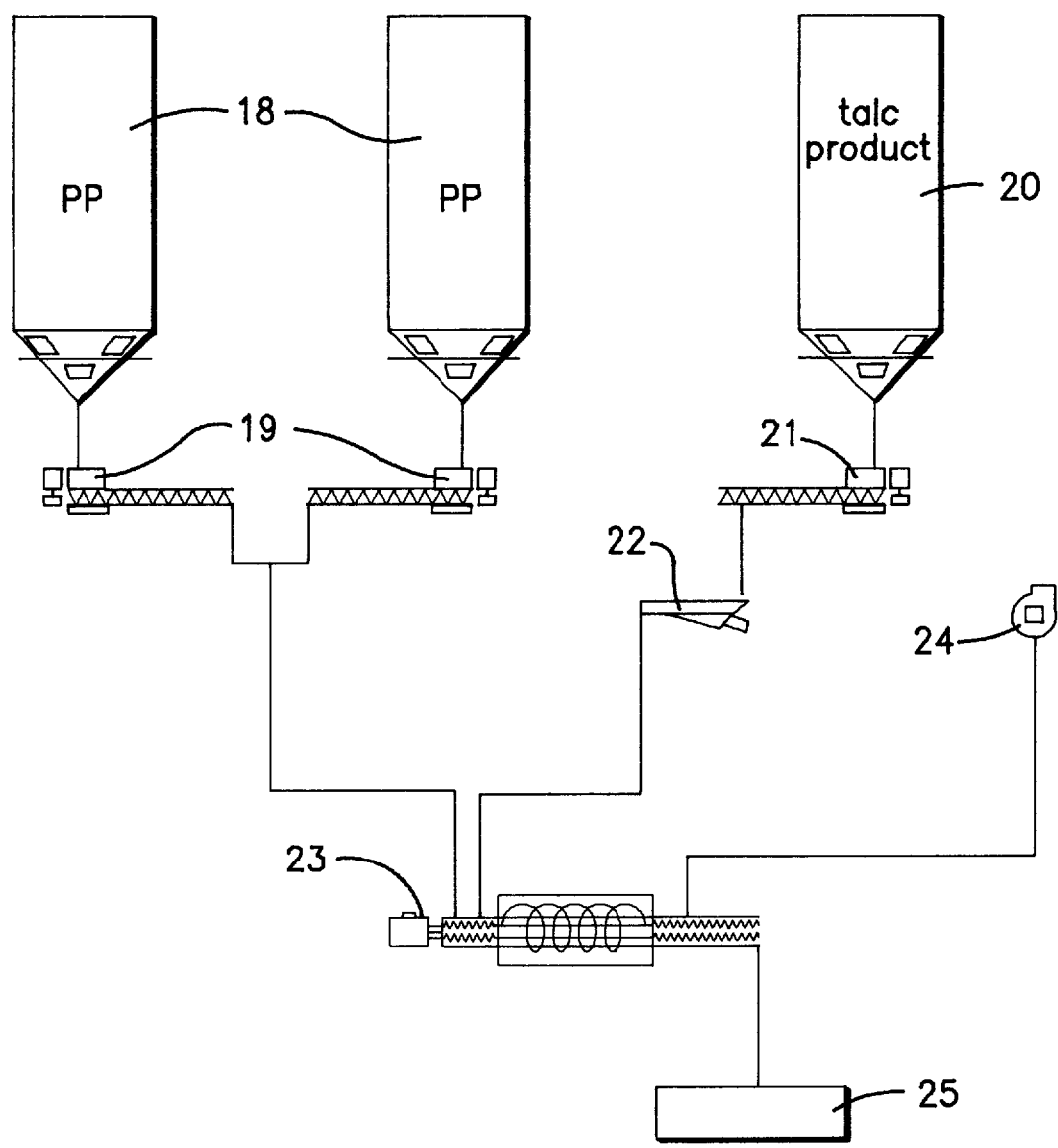
FIG. 5 is diagram of an installation for mixing this product with a thermoplastic material.

FIG. 5 shows a mixing installation for a thermoplastic material consisting of polypropylene (PP). This installation is conventional and essentially comprises: two hoppers 18 for feeding PP, a device 19 for metering PP by weight, a silo 20 for feeding the talc product, a metering device 21 for this product, a unit 22 feeding the talc product, a mixing machine 23 with horizonal mixing screws (comprising heating elements, motors, etc.), a vacuum pump 24 for removing volatile products and a granulating system 25. In this installation, the talc product is mixed after the PP has melted. In other installations, talc is fed into non-molten PP.

Granules of PP are obtained at the outlet from the installation, after cooling, within which grains of the initial talc powder are dispersed.

By way of comparison, in example 1, a test was made by placing the intermediate product produced according to the invention in the silo 20; a test using a treated talc powder in the absence of PEG; and a test using an untreated talc powder.

EXAMPLE 1

Preparation of the intermediate product according to the invention initial talc: talc powder with a mean particle size of 1.7 micron sold by the Société Talc de Luzenac under the tradename "Steamic 00S", tamped apparent density of the initial talc: 0.35, proportion of water with respect to the weight of dry talc: 18%, proportion of PEG with respect to the weight of dry talc: 0.3%, molecular weight of PEG: 20,000 ("Carbowax 20M" type from the Union Carbide Company), drying until a moisture content of 0.2% was reached (hot air at 150° C.), On leaving the drier 10, the granules 16 had the following properties:

tamped apparent density: 0.95, particle size measured by sieving: 48.6% of granules were larger than 2 mm in size, 24.5% between 1 and 2 mm, 12.3% between 0.5 and 1 mm and 14.6% less than 0.5 mm.

After handling, the product 17 had the following properties:

tamped apparent density: 0.84, particle size: 12.5% of agglomerates were larger than 2 mm in size, 20.4% were between 1 and 2 mm, 24.5% were between 0.5 and 1 mm and 42.6% were less than 0.5 mm.

residual moisture: 0.19%.

Incorporation in the base material

The product referred to above was incorporated, after handling, with polypropylene of the "PPN 1060" type from the Hoechst company at a rate of 40% by weight, with conventional additives: calcium stearate (0.1%), blocked phenol (0.3%), distearyl thiodipropionate (0.3%).

The installation was supplied with the mixture without any problems with a flow rate equal to that obtained with talc powders having a mean particle size greater than 10 microns. Metering remained regular and precise. No abnormal dust formation was noted.

The granules of plastic material obtained were analysed and it was found that the talc was perfectly dispersed in the form of the initial grains. The mechanical properties of specimens prepared with these granules are shown in the table below.

Comparative test with a non-treated talc

The initial talc powder was placed directly in the feed silo 20 of the mixing installation. The flow rate was reduced by a half. Metering became irregular (verification by ash content at regular intervals) and varied between 36 and 44%. Formation of a large amount of dust was observed.

Comparative test with treated talc without PEG

The initial talc was treated as in the invention but without adding PEG in water.

The operation in the mixing installation was comparable with that obtained in the invention. However, poor distribution of talc was observed in the polypropylene granules obtained, with the presence of undispersed agglomerates.

The table below gives the properties of specimens prepared during the preceding tests.

|   | Modulus of elasticity in flexure (MPa) | Impact resistance Charpy method 1 D (kJ/m$^2$) | Thermal stability at 150° C. (days) |
|---|---|---|---|
| Method of the invention (treatment with PEG) | 4600 | 30 | 15 |
| Untreated talc powder | 4600 | 30.9 | 7 |
| Treated talc powder without PEG | 4600 | 25.8 | 7 |

It was noted that the method of the invention made it possible to reach the performances obtained with the addition of a fine talc powder, without the operating disadvantages and with better thermal stability. Impact resistance was an indication of the homogeneity of the talc/PP mixture and of the quality of the talc dispersion in the PP.

I claim:

1. A method for incorporating a granular talc powder in a material, which comprises:
   a) mixing the talc powder with water and a polyethylene glycol (PEG), a polypropylene glycol (PPG) or a copolymer of these compounds, in relative proportions by weight of between 10% and 35% of water with respect to the weight of dry talc, and between 0.05% and 2% of PEG, PPG or copolymer with respect to the weight of dry talc;
   b) pressing the mixture through dies, and chopping the mixture into lengths on leaving the dies so as to obtain granules with a mean size greater than that of the grains of the initial powder;
   c) incorporating the products obtained in the material either in the form of granules resulting from the chopping operation, or, following handling operations, in the form of a mixture of powder and agglomerates resulting from a partial disintegration of the granules; and
   d) carrying out a mechanical dispersion so as to disintegrate the granules or agglomerates completely in order to release the grains of the initial powder and to distribute said grains in the mass of material.

2. The method as recited in claim 1, wherein the material is a thermoplastic material.

3. The method as recited in claim 1, wherein before their incorporation in the material, the granules are dried so as to remove water until a residual percentage moisture content is reached of less than 0.5% water with respect to the weight of dry talc.

4. The method as recited in claim 1, wherein the polyethylene glycol, polypropylene glycol, or copolymer has an molecular weight of between 100 and 50,000.

5. The method as recited in claim 1, wherein the polyethylene glycol, polypropylene glycol, or copolymer is initially dissolved in water, and the talc is then introduced into the solution to obtain a mixture.

6. The method as recited in claim 1, wherein the mixture is prepared with a proportion by weight of water of between 15% and 30%, and a proportion by weight of polyethylene glycol, polypropylene glycol or copolymer of between 0.1% and 0.5% with respect to the weight of dry talc.

7. The method as recited in claim 1, wherein the mixture is pressed and chopped into a length so that the mean size of the granules is between 2 mm and 20 mm.

8. The method as recited in claim 2, wherein the talc granules are incorporated and mixed in the thermoplastic material, the whole is heated until the thermoplastic material melts, and a mechanical dispersion action is carried out by mixing the viscous mixture obtained.

9. The method as recited in claim 2, wherein the thermoplastic material is heated until it melts, the talc granules are incorporated into the molten thermoplastic material, and a mechanical dispersing action is carried out by mixing the viscous mixture obtained.

10. The method as recited in claim 8, wherein the thermoplastic material is polypropylene, the talc granules being incorporated in said thermoplastic material so that the proportion of talc by weight is between 5% and 60% with respect to the polypropylene.

11. The method as recited in claim 9, wherein the thermoplastic material is polypropylene, the talc granules being incorporated in said thermoplastic material so that the proportion of talc by weight is between 5% and 60% with respect to the polypropylene.

12. The method as recited in claim 1, wherein the talc powder has a mean particle size less than or equal to 5 microns.

13. A method for treating a granular talc powder having a mean particle size less than or equal to 5 microns, with a view to increasing the apparent density thereof, the method comprising:
   mixing the talc powder with water and a polyethylene glycol (PEG), polypropylene glycol (PPG) or a copolymer of these compounds, in relative proportions by weight of between 10% and 3% of water with respect to the weight of dry talc, and between 0.1% and 2% of polyethylene glycol, polypropylene glycol or copolymer with respect to the weight of dry talc;
   pressing the mixture through dies and chopping said mixture into lengths on leaving the dies so as to obtain granules with a mean size greater than that of the grains of the initial powder; and
   drying the granules so as to remove water until a percentage residual moisture content of 0.5% of water by weight is reached, with respect to the dry talc weight.

14. The method as recited in claim 13, wherein the mixture is prepared using polyethylene glycol, polypropylene glycol or a copolymer having an molecular weight of between 100 and 50,000, in a proportion by weight of between 0.2% and 0.5% with respect to the weight of dry talc.

15. The method as recited in claim 13, wherein the mixture is prepared by providing a proportion of water of between 15% and 30% by weight with respect to the weight of dry talc.

16. A finely divided solid product for use as a filler in a material, comprising talc grains with a mean size less than or equal to 5 microns, wherein:
   at least a fraction of the talc grains are bound together in the form of granules or agglomerates with a mean size greater than that of the talc grains;
   polyethylene glycol, polypropylene glycol or a copolymer of these compounds is mixed with the product in a proportion of between 0.1% and 2% with respect to the weight of dry talc; and
   the tamped apparent density of the product is between 0.4 and 1.6 g/cm$^3$.

* * * * *

UNITED STATES PATENT AND TRADEMARK OFFICE
CERTIFICATE OF CORRECTION

PATENT NO. : 5,827,917
DATED      : October 27, 1998
INVENTOR(S): Georges FOURTY It is certified that error appears in the above-indentified patent and that said Letters Patent is hereby corrected as shown below:

```
     On the title page, rewrite Item [22] as follows:
--[22] PCT Filed:      Dec. 19, 1994
  [86] PCT No.:        PCT/FR94/01490
       §371 Date:      June 18, 1996
       §102(e) Date:   June 18, 1996
  [87] PCT Pub. No.:   WO95/17998
       PCT Pub. Date:  July 6, 1995--.
```

Signed and Sealed this

Twelfth Day of January, 1999

Attest:

*Attesting Officer*       *Acting Commissioner of Patents and Trademarks*